United States Patent [19]
Feist et al.

[11] 3,905,707
[45] Sept. 16, 1975

[54] OPTICAL LEVEL

[76] Inventors: Wieland Feist, 6, Erfurter-Strasse; Hans-Joachim Stachel, 46, Hausbergstrasse, both of, Jena, Germany

[22] Filed: June 7, 1974

[21] Appl. No.: 477,247

Related U.S. Application Data

[63] Continuation of Ser. No. 243,516, May 1, 1972, abandoned.

[52] U.S. Cl. .................................. 356/249; 33/209
[51] Int. Cl.² ........................................... G01C 9/18
[58] Field of Search ........... 356/138, 148, 156, 248, 356/249; 33/206, 209

[56] References Cited
UNITED STATES PATENTS

| | | | |
|---|---|---|---|
| 2,386,621 | 10/1945 | Luboshez | 356/249 |
| 2,857,804 | 10/1958 | Rantsch | 356/249 |
| 2,876,673 | 3/1959 | Hamilton | 356/249 |
| 3,044,343 | 7/1962 | Fontguyon | 356/249 |
| 3,583,814 | 6/1971 | Shumway, Jr. | 356/249 |

*Primary Examiner*—Ronald L. Wibert
*Attorney, Agent, or Firm*—Nolte and Nolte

[57] ABSTRACT

An optical level has at least two windows respectively serving as entrance aperture and exit aperture for a beam of light. The optical level can assume two positions of use and receives three media of different densities that do not blend with each other. The volume of the medium of the greatest density is equal to the volume of the medium of the smallest. According to the position of the optical level, the beam of light is reflected at least once by the bounding surface between the medium of medial density and the medium of the greatest density or by the bounding surface between the medium of medial density and the medium of the smallest density. The beam of light can also be reflected by the interior wall of the level.

3 Claims, 6 Drawing Figures

OPTICAL LEVEL

This is a continuation of application Ser. No. 243,516 filed May 1, 1972, now abandoned.

This invention is concerned with an optical level having at least two windows and receiving at least one medium which fills it only in part and whose bounding surface not contacting the optical level gravitates to form a horizontal plane by which a beam of light entering through one window is reflected at least once before leaving through the other. The optical level gives particularly useful service in indicating verticality in optical angle-measuring instruments.

Optical levels in geodetical angle-measuring instruments are used for imparting a desired direction to the ray path of the respective telescope or microscope by exploitation of the phenomenon that the surface of liquids obeys the law of gravity and remains level regardless of the inclination of the instrument. Thus, there is either a V-shaped body of liquid traversed by a beam of rays, or a liquid level reflecting a beam of rays. If such a level including a reflecting surface is mounted in an angle-measuring instrument that operates in both upright and inverted position, any defocusing of the optical system causes the beam in the level to traverse media of different densities, for example air and alcohol, depending on which of the two positions the instrument assumes. This calls for additional focusing facilities, thus increasing the cost and impairing the handiness of the instrument in question. The desired compensation effect cannot be obtained by means of a compensator operating with a V-shaped body of liquid in both suspended and supported condition because such a compensator, while balancing an error in one position, doubles this error in the other.

The present invention aims at obviating the foregoing disadvantage in optical levels by providing a level which includes a reflecting bounding surface such that, regardless of the setting of the angle-measuring instrument, defocusing of the optical system is avoided without additional optical and/or mechanical means and without loss of time.

To this end, the present invention consists in an optical level receiving three media of different densities, in which the volume of the medium of greatest density is equal to the volume of the medium of smallest density, and the beam of rays in the level is propagated only in the medium of medial density. The level is ideally adapted for service in any angle-measuring instrument suitable for measurements in two vertical positions opposite to one another, particularly so in the odolites, leveling instruments and sounding devices. In one of the two positions, the ray beam is reflected by that bounding surface of the medium of greatest density which contacts the medium of medial density. In the other position, the ray beam is reflected by that bounding surface of the medium density which contacts the medium of smallest density. Alternatively, the optical level may have four windows for two ray beams, so that in one position of the angle-measuring instrument the one ray beam is reflected by the bounding surface of the medium of greatest density and the other beam is reflected by the bounding surface of the medium of medial density, these bounding surfaces being separated from one another by the medium of medial density. For multiple reflection it is advantageous to provide that at least part of the interior wall of the level operates as a reflector.

In order that the invention may be more readily understood, reference is made to the accompanying drawings, which illustrate diagrammatically and by way of example four embodiments thereof, and in which.

Figure 1:
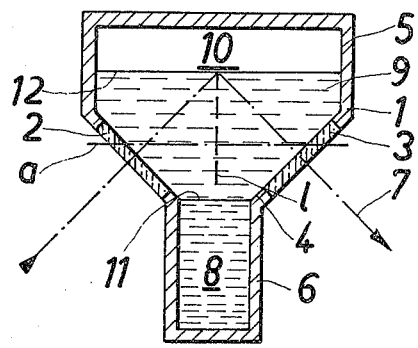
FIG. 1 is a first embodiment, shown in a longitudinal section through an optical level.

In FIG. 1 of the drawings, a housing having two windows 2 and 3 encloses level spaces 4, 5 and 6. The level space 4 is of trapezoidal cross section, its parallel faces being open and respectively connected to the level spaces 5 and 6, which are of rectangular cross section. This form of the housing 1 makes it easy for a light beam 7 entering through the window 2 to leave through the window 3. The housing 1 receives three media 8, 9, 10 of different densities, for example mercury, alcohol and air, which do not blend with each other but obey the law of gravity by taking positions according to their individual densities, the medium 8 being that of the greatest density, and the medium 10 that of the smallest. The media 9 and 10 contact one another in a bounding surface 12, and the media 9 and 8 in a bounding surface 11. The bounding surfaces 11 and 12 serve as reflectors. The media 8 and 10 have the same volume, and the volume of the medium 9 is great enough for the beam 7 to pass only therethrough.

When the level 1 assumes zero position, as shown in the drawing, the beam 7 entering the housing 1 at least approximately at right angles to the window 2 is reflected by the bounding surface 12 and leaves the housing 1 through the window 3, thus the beam 7 propagates through the space 4 of trapezoidal cross section 8. If the bounding surface 12, and accordingly the bounding surface 11, are tilted through an angle $\alpha$ relatively to the direction of gravity, the beam 7 reflected by the bounding surface 12 is deviated by that angle. The influence of the refractive indici of the media is left out of account in the present consideration.

If the level 1 and the beam 7 are tilted up or downward through 180° about an axis $a$ which in FIG. 1 is parallel to the plane of the drawing and substantially at right angles to the axis of incidence, the medium 8 gravitates to the housing space 5, the medium 10 levitates to the cell space 6, and the medium 9 retains its position. The bounding surfaces 11 and 12 also remain in their respective positions, since the volumes of the media 8 and 10 are equal to one another.

Figure 2:
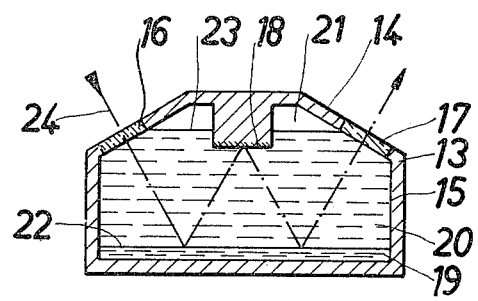
FIG. 2 is a second embodiment, shown in a longitudinal section through an optical level including a reflector.

An optical level 13, shown in FIG. 2, is of trapezoidal cross section at 14 and rectangular cross section at 15. The part 14 of the level housing has windows 16 and 17 opposite to one another and includes a rigid reflector 18. The level 13 receives three media 19, 20, 21 which do not blend with each other, the medium 19 being that of the greatest density, and the medium 21 that of the smallest. The volumes of the media 19 and 21 are equal to one another. The medium 20 being of median density with respect to media 19 and 21 is enclosed in the level spacer 14 of the trapezoidal cross section. Optically effective bounding surfaces 22 and 23, which separate the media from each other, are parallel to the plane of the reflector 18 when the level 13 assumes zero position, as shown in the drawing.

A beam 24 entering the level 13 through the window 16 is successively reflected by the bounding surface 22, the reflector 18 and the bounding surface 22, and leaves the level 13 through the window 17. If the level 13 is rotated in the plane of the drawing by an angle α, the bounding surfaces 22 and 23 assume that angle to the incident beam 24, so that the known laws of light reflection cause the beam 24 to leave the level 13 at an angle four times α.

Figure 3:
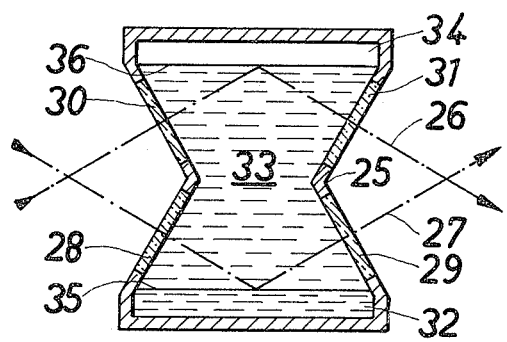
FIG. 3 is a third embodiment, shown in a longitudinal section through an optical level for reflecting two different beams of light.

In FIG. 3, two beams 26 and 27 inclined relatively to one another traverse and are reflected in a level 25, which has two pairs of oppositely disposed windows 28, 29 and 30, 31 and receives three media 32, 33, 34 of different densities, the medium 32 being that of the greatest density and the medium 34 that of the lowest. The volumes of the media 32 and 34 are equal. The media 32, 33 contact one another in a bounding surface 35, and the media 33, 34 in a bounding surface 36.

The beam 27 entering the level 25 through the window 28 is reflected by the bounding surface 35 and leaves the level 25 through the window 29. Analogously, the beam 26 is reflected between the windows 30 and 31 by the bounding surface 36. In all other respects there holds good what has been explained with reference to FIG. 1.

The levels 13 and 25 can also be tilted through 180° in a similar manner to that described with reference to FIG. 1 and used to the same optical effect, since this rotation does not alter either the relative positions of the bounding surfaces 22, 23 and 35, 36 or the positions of the media 20 and 33 respectively traversed by the beams 24 and 26, 27.

Figure 4:
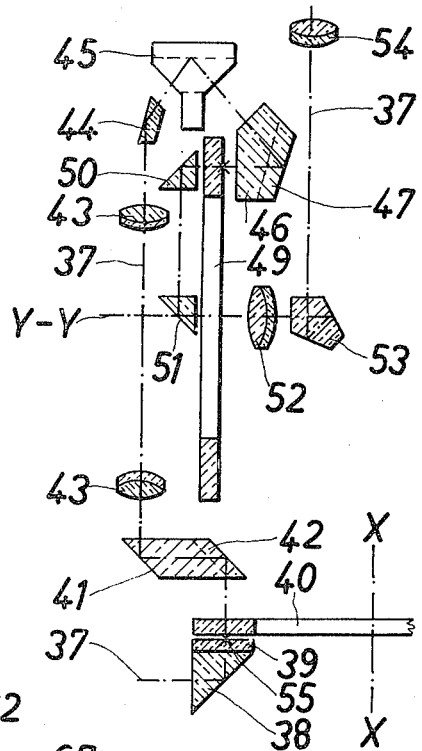
FIG. 4 shows the elements of an optical system for measuring rotations of an angle-measuring instrument equipped with a level according to FIG. 1.

The optical elements shown in FIG. 4 are rotatable about axes X — X and Y — Y. An observation ray path 37 traverses a rectangular prism 38, a plate 39 thereon having a mark 55, a graduated circle 40, a rhombic prism 41 having an edge 42, an imaging system 43, a deviating prism 44, an optical level 45 receiving three different media, a deviating prism 46 having an edge 47, a graduated circle 49, two rectangular prisms 50, 51, a microscope objective 52, a pentaprism 53, and a microscope eyepiece 54. The mark 55 indicates the readings of both the circles 40 and 49, the images of which appear in juxtaposition to one another in the field of vision (not shown) of the microscope 52, 53, 54. The optical system images the mark 55 on the circle 49 in a position which is controlled by the level 45, but is independent of the inclination of this level. In this position, the mark 55 can be viewed through the microscope 52, 53, 54 together with the reading on the circle 40.

Figure 5:
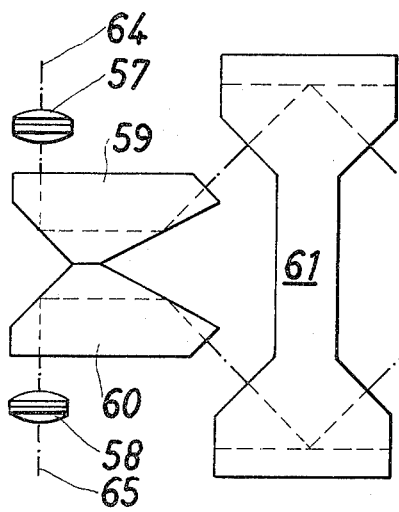
FIG. 5 shows an optical sounding device having a level similar to that of FIG. 3.

FIG. 5 shows a zenith-nadir optical device comprising an eyepiece 56 and two objectives 57, 58 for simultaneous sighting in two directions opposite to one another. An optical system which comprises two prisms 59, 60, a level 61 receiving three different media, and two prisms 62, 63 is located between the objectives 57, 58 on the one hand and the eyepiece 56 on the other and serves for reflecting beams 64, 65, giving these beams definite positions and combining them to form one eyepiece beam 66. The eyepiece focal plane, denoted 67, is at right angles to the eyepiece beam 66. The prisms 62, 63 form an image-separation edge 68, which is at right angles to the plane of the drawing.

The levels 45 and 61 respectively shown in FIGS. 4 and 5 are for regulating the path of the reading beam or the sighting beam independently of changes in the inclination of the optical systems in such a manner as to bar such changes from influencing the reading or measurement, as is described for example in the Austrian "Zeitschrift fur Vermessungswesen", 1957, pages 176 to 179, and in the examined and published German patent application No. 1,252,910.

As a matter of course, the systems according to FIGS. 4 and 5 are not obstructed in their effectivity when they are rotated through 180° so that the level 45 of FIG. 4 comes to lie below, or the objective 57 of FIG. 5 changes place with the objective 58.

Only half the system of FIG. 5 will do if this half is rotated through 180° relatively to zenith-nadir about an axis parallel to the plane of the drawing.

Figure 6:
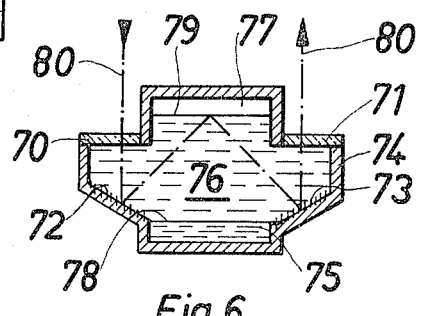
FIG. 6 is a fourth embodiment, shown in a longitudinal section through a level including two reflectors.

In FIG. 6, a level 74 has two windows 70, 71, includes two reflectors 72, 73, and receives three media 75, 76, 77 of different densities separated from each other by bounding surfaces 78, 79. A beam 80 entering the level 74 through the window 70 is successively reflected by the reflector 72, the bounding surface 79 and the reflector 73 before leaving the level 74 through the window 71. With respect to the kinds and effects of the media there holds good what has been remarked with reference to FIGS. 1 to 3. The level of FIG. 6 is effective in quite the same manner when rotated through 180° about an axis (not shown) which is at right angles to the plane of the drawing or parallel to the bounding surface and this plane. When in the position represented in FIG. 6, the level 74 is effective without restriction if the medium 75 is replaced by the medium 76, if the medium 76 is of a density greater than that of the medium 77, and if there is only one bounding surface, namely the surface 79.

We claim:

1. An optical level for determining verticality comprising a housing, said housing being completely filled with three non-miscible fluid media of different densities each of said media occupying corresponding one of three vertically spaced zones of said housing and defining horizontal bounding surfaces between adjacent zones, at least two transparent windows in the housing for the entrance and exit of a beam of light, said housing having a reference axis, said windows, in a position of the housing in which said reference axis is vertical, opening to and exiting from a central one of said three zones whereby a beam of light passing through said windows is propagated exclusively in said central zone, and said windows being inclined to and symmetrically disposed about said reference axis in said position, said medium of the least density and the medium of the greatest density having equal volumes and occupying upper and lower ones of said zones respectively and sandwiching the medium of medial density.

2. An optical level as claimed in claim 1 wherein the housing includes at least one reflecting surface for reflecting a beam of light between the light entrance window and the light exit window, said reflecting surface being disposed in said central zone in that position of the housing in which the reference axis is vertical.

3. An optical level as claimed in claim 1 wherein the central zone of said housing, in that position of the housing in which said reference axis is vertical, is of substantially trapezoidal cross section.

* * * * *